United States Patent [19]

Kabelitz et al.

[11] Patent Number: 5,059,092
[45] Date of Patent: Oct. 22, 1991

[54] VACUUM PUMP HAVING EMERGENCY BEARINGS

[75] Inventors: Hans-Peter Kabelitz, Cologne; Harald Lässig, Rösrath; Helmut Schneider, Zülpich, all of Fed. Rep. of Germany

[73] Assignee: Leybold Aktiengesellschaft, Hanau, Fed. Rep. of Germany

[21] Appl. No.: 568,037

[22] Filed: Aug. 16, 1990

[30] Foreign Application Priority Data

Aug. 25, 1989 [DE] Fed. Rep. of Germany ....... 3928047
Sep. 22, 1989 [DE] Fed. Rep. of Germany ....... 3931661

[51] Int. Cl.$^5$ ............................................. F01D 1/36
[52] U.S. Cl. .................. 415/90; 417/423.4; 417/423.12
[58] Field of Search ........... 415/90; 417/423.4, 423.12

[56] References Cited

U.S. PATENT DOCUMENTS 4,036,565 7/1977 Becker .................................. 415/90
4,541,772 9/1985 Becker .................................. 415/90

FOREIGN PATENT DOCUMENTS 0155624 3/1985 European Pat. Off. .
3705912 9/1988 Fed. Rep. of Germany ........ 415/90

Primary Examiner—John T. Kwon
Attorney, Agent, or Firm—Spencer & Frank

[57] ABSTRACT

A vacuum pump has a pump housing, magnetic bearings mounted in the housing, a rotary assembly including a pump rotor disposed in the housing and supported for rotation by the magnetic bearings and two spaced emergency bearings supporting the pump rotor when it deviates by a predetermined extent from a desired position. The rotary assembly has a center of gravity which is situated between the emergency bearings and which is spaced approximately equally therefrom.

8 Claims, 1 Drawing Sheet

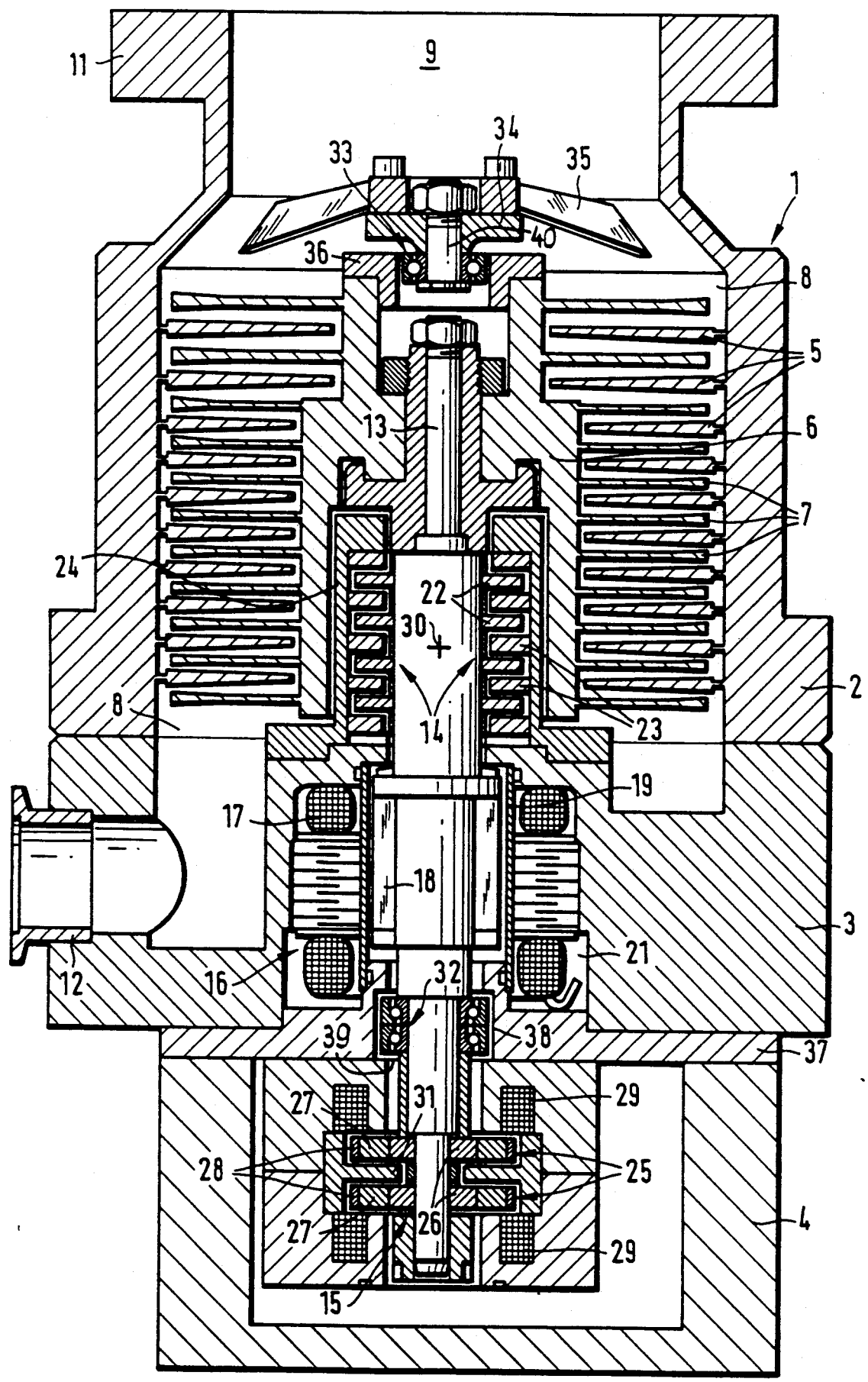

VACUUM PUMP HAVING EMERGENCY BEARINGS

BACKGROUND OF THE INVENTION

This invention relates to a vacuum pump, particularly to a turbomolecular vacuum pump which has a rotor supported in the pump housing on magnetic bearings and which further has two emergency (auxiliary) bearings.

The purpose of the emergency bearings is to prevent potentially damaging changes in the position of the rotor from a desired position. The reasons for radial rotor excursions are usually jars or lateral blows against the pump. Axial deviations from the desired position are caused, for example, by air rushing into the rotor zone or into the attached vessel to be evacuated. In vacuum pumps where the pump rotor is supported by electromagnetic bearings, further reasons for positional deviations from the desired position of the rotor may be a defect in the regulation of the coil current or other breakdown which interferes with the magnetic flux.

Emergency bearings for molecular or turbomolecular pumps are typically dry-running bearings since grease or oil adversely affect the quality of the vacuum generated by the pump. By using lubricated bearings, the advantage of the magnetic bearings, that is, an absolute freedom from lubricants and thus an absence of hydrocarbons would be surrendered. Since the service life of dry-running bearings is 0 limited, it is a requirement that the rotor, after a shift from the desired position has occurred in which the emergency bearing takes over, reassumes its desired position as rapidly as possible to thus avoid an excessive stress on the emergency bearings. In tests with prototypes, however, it has been repeatedly observed that the rotor, after lateral jars against the pump, tended to "stick" to the emergency bearings.

SUMMARY OF THE INVENTION

It is an object of the invention to provide an improved emergency bearing arrangement in vacuum pumps in which unnecessary stresses are avoided.

This object and others to become apparent as the specification progresses, are accomplished by the invention, according to which, briefly stated, two axially spaced emergency bearings are provided, and the center of gravity of the rotating system (rotor assembly) is situated between the two emergency bearings at an approximately equal distance therefrom.

It was surprisingly found that in an arrangement of the emergency bearings with respect to the center of gravity of the rotating system according to the invention, the rotor did not "stick" to the emergency bearings since the forces which have been necessary to draw away the shaft from the emergency bearings were found to be the smallest.

According to an advantageous further feature of the invention, one of the two magnetic bearings of the rotor is situated in the zone of the center of gravity of the rotating system. In such a solution, the rotating system very rapidly reassumes its desired position after jars.

BRIEF DESCRIPTION OF THE DRAWING

The sole Figure is an axial sectional view of a preferred embodiment of the invention.

DESCRIPTION OF THE PREFERRED EMBODIMENT

The turbomolecular vacuum pump 1 shown in the Figure has housing parts 2, 3 and 4. The housing part 2 constitutes the pump stator and carries stator vanes 5. The stator vanes 5 and the rotor vanes 7 secured to the pump rotor 6 are arranged alternately in series and form the annular gas pumping channel 8 which connects the pump inlet 9, formed by a coupling flange 11, with the pump outlet 12 to which a prevacuum pump is conventionally coupled.

The rotor 6 is secured to a rotor shaft 13 which, in turn, is supported in the housing of the pump 1 by magnetic bearings 14 and 15. Between the two magnetic bearings 14 and 15 the drive motor 16 is arranged which is formed of a coil (stator windings) 17 and an armature 18 rotating with the shaft 13 as a unit. The drive motor 16 is designed as a split-tube motor whose split tube 19 is situated between the coil 17 and the armature 18. The coil 17 is arranged in a space 21 defined by the split tube 19 and the housing part 3 and is inaccessible for the gases pumped by the vacuum pump 1.

The upper magnetic bearing 14 is a passive magnetic bearing (permanent magnet bearing) formed of rotary annular discs 22 secured to the shaft 13 and stationary annular discs 23 surrounded by a sleeve 24 affixed to the housing part 3.

The magnetic bearing 15 is axially active and radially passive. For this purpose, on the shaft 13 annular discs 25 are secured, each of which is formed of a hub ring 26, a permanent magnet ring 27 and an armature ring 28. The purpose of the armature rings is to avoid destruction of the permanent magnet rings 27 due to high centrifugal forces.

With the rotary permanent magnet rings 27 stationary coils 29 are associated which generate magnetic fields that may be altered by the current which is passed through the coils. The variation of the coil current is effected as a function of the operation of non-illustrated axial sensors. In the gap between the annular disc 25 that rotates with the shaft 13 a stationary annular disc 31 is disposed which is formed of non-magnetizable material of high electric conductivity. Such material effects a bearing stabilization with effective eddy current damping. A bearing which corresponds to the bearing 15 is described in European Patent No. 155,624 which is incorporated herein by reference.

The center of gravity of the rotating assembly is designated at 30. The center of gravity 30 is situated on the rotor shaft 13, inside the magnetic bearing 14.

An upper emergency bearing 33 is secured to a stub shaft 40 mounted in a central carrier 34 which is situated in the inlet zone 9 of the pump 1 and which is supported on the housing part 2 by webs 35. The emergency bearing 33 is surrounded by a sleeve 36 affixed to the top of the rotor 6. Between the inner wall of the sleeve 36 and the outer race of the upper emergency bearing 33 a gap is provided so that these components are out of contact with one another as long as the rotor is in its desired position. In case external forces, such as jars lead to increased radial excursions of the axis of the rotor 6, a contacting between the inner wall of the sleeve 36 and the outer race of the upper emergency bearing 33 occurs. The gap between the upper emergency bearing 33 and the sleeve 36 is so designed that the radial excursions are limited to a permissible extent. As an alternative, the emergency bearing 33 may be affixed to the inside of the sleeve 36, in which case an annular gap is defined between the emergency bearing 33 and the stub shaft 40.

A lower emergency bearing 32 which rotates in unison with the shaft 13 has the additional purpose of preventing damaging axial deviations of the rotor 6 from its desired position. The lower emergency bearing 32 is surrounded by a cylindrical recess 38 provided in an intermediate flange 37 situated between the housing parts 3 and 4. The outer race of the lower emergency bearing 32 settles on a shoulder 39 in case of excessive axial displacements of the rotor 6 (for example, in case of an air break-in into the inlet zone 9 of the pump). Expediently, the lower emergency bearing 32 comprises two shoulder bearings (angular-contact bearings) which are paired in such a manner that the inner shoulders of the outer bearing races are in an adjoining, back-to-back relationship. Shoulder bearings of this type may take up high axial forces and have a small axial play which is particularly desirable in magnet bearing-supported turbomolecular vacuum pumps. 0 The emergency bearings 32, 33 are so arranged that their distance from the center of gravity 30 is equal. As a result of this arrangement the rotating system, after jars which result in the emergency bearings 32 and 33 to become operative, very rapidly reassumes its desired position.

It will be understood that the above description of the present invention is susceptible to various modifications, changes and adaptations, and the same are intended to be comprehended within the meaning and range of equivalents of the appended claims.

What is claimed is:

1. A vacuum pump comprising:
   (a) a housing;
   (b) a first, fully permanent magnet bearing disposed in said housing;
   (c) a second, partly permanent magnet and partly electromagnet bearing disposed in said housing;
   (d) an upper emergency bearing disposed in said housing;
   (e) a lower emergency bearing disposed in said housing and being spaced from said upper emergency bearing;
   (f) a pump rotor disposed in said housing and supported for rotation by said first and second magnet bearings; aid pump rotor being supported by said upper and lower emergency bearings when said pump rotor deviates by a predetermined extent from a desired position; said pump rotor further having a rotor shaft; said second magnet bearing being mounted on said rotor shaft; and
   (g) a pump motor including stationarily supported motor windings and an armature carried by said rotor shaft and surrounded by said motor windings; said lower emergency bearing being situated between said motor windings and said second magnet bearing; said pump rotor and said armature being included in a rotary assembly having a center of gravity; said center of gravity being situated between said upper and lower emergency bearings and being spaced approximately equally therefrom and further being located inside said first magnet bearing; said armature being situated between said center of gravity and said lower emergency bearing.

2. A vacuum pump as defined in claim 1, wherein said upper and lower emergency bearings are located essentially at opposite axial ends of said pump rotor.

3. A vacuum pump as defined in claim 1, wherein said pump rotor is vertically oriented; further comprising a sleeve affixed to an upper end of said pump rotor coaxially therewith; said sleeve having an inner face surrounding said upper emergency bearing with a clearance in the desired position of said pump rotor.

4. A vacuum pump as defined in claim 1, wherein said pump rotor is vertically oriented; said lower emergency bearing being mounted on said rotor shaft and having an outer race provided with an annular radial underface; said pump housing having an annular radial shoulder being in alignment with said underface and being spaced therefrom in said desired position of said pump rotor.

5. A vacuum pump as defined in claim 4, wherein said lower emergency bearing comprises two axially adjoining angular-contact bearings.

6. A vacuum pump as defined in claim 5, wherein each said angular-contact bearing has an outer race provided with a radial shoulder face; the radial shoulder faces of the two angular-contact bearings being in an adjoining, back-to-back relationship with one another.

7. A vacuum pump as defined in claim 1 wherein the emergency bearings are dry-running bearings.

8. A vacuum pump as defined in claim 1, wherein said pump motor comprises a split-tube motor.

* * * * *